(12) United States Patent
Vande Vyvere

(10) Patent No.: US 11,224,963 B2
(45) Date of Patent: Jan. 18, 2022

(54) HOLDER

(71) Applicant: MOERMAN NV, Meulebeke (BE)

(72) Inventor: Guy Vande Vyvere, Wortegem-Petegem (BE)

(73) Assignee: MOERMAN NV

( * ) Notice: Subject to any disclaimer, the term of this patent is extended or adjusted under 35 U.S.C. 154(b) by 847 days.

(21) Appl. No.: 15/953,371

(22) Filed: Apr. 13, 2018

(65) Prior Publication Data

US 2018/0297190 A1    Oct. 18, 2018

(30) Foreign Application Priority Data

Apr. 13, 2017 (BE) .................................. 2017/5260

(51) Int. Cl.
| | | |
|---|---|---|
| *B25G 3/04* | (2006.01) | |
| *B25G 3/36* | (2006.01) | |
| *B25G 3/02* | (2006.01) | |
| *B25G 3/30* | (2006.01) | |
| *F16B 9/00* | (2006.01) | |

(52) U.S. Cl.
CPC .................. *B25G 3/36* (2013.01); *B25G 3/02* (2013.01); *B25G 3/04* (2013.01); *B25G 3/30* (2013.01); *F16B 9/054* (2018.08); *F16B 2200/10* (2018.08)

(58) Field of Classification Search
CPC ... B25G 3/02; B25G 3/04; B25G 3/14; B25G 3/30; B25G 3/34; B25G 3/12; Y10T 403/471; F16B 9/054
See application file for complete search history.

(56) References Cited

U.S. PATENT DOCUMENTS

| | | | | |
|---|---|---|---|---|
| 4,684,283 A | * | 8/1987 | Lewis, Jr. ................ | B25G 3/04 403/299 |
| 4,892,434 A | * | 1/1990 | Miller ...................... | B25G 3/14 403/361 |
| 5,210,898 A | * | 5/1993 | Carey ...................... | B25G 3/30 15/176.2 |

FOREIGN PATENT DOCUMENTS

| | | | | | |
|---|---|---|---|---|---|
| DE | 957 356 | * | 1/1957 | ............... | B25G 3/14 |
| FR | 743376 | * | 3/1932 | ............... | B25G 3/12 |
| FR | 1465899 | * | 1/1967 | ............... | B25G 3/15 |
| GB | 178351 | * | 4/1922 | ............... | B25G 3/12 |
| GB | 368120 | * | 3/1932 | ............... | B25G 3/14 |

OTHER PUBLICATIONS

Translation of FR 743,376. worldwide.espacenet.com. Apr. 29, 2021.*

* cited by examiner

*Primary Examiner* — Michael P Ferguson
(74) *Attorney, Agent, or Firm* — Fresh IP PLC; Clifford D. Hyra; Aubrey Y. Chen

(57) ABSTRACT

Holder (1) for releasably connecting a handle to a tool (2), in which the holder (1) comprises a space (3) in which a handle end is introducible, in which this space (3) comprises a wall surface with one or more projecting cutting elements (5a, 5b) for cutting complementary screw thread by means of which the one or more cutting elements (5a, 5b) are releasably connectable, in which the holder (1) comprises a coupling portion (6) comprising the one or more cutting elements (5a, 5b) and a retaining portion (7), in which the coupling portion (6) is made of a first material comprising plastic and the retaining portion (7) is made of a second material, in which the hardness of the first material is greater than the hardness of the second material.

15 Claims, 5 Drawing Sheets

HOLDER

The present application claims priority from Belgian Patent Application No. BE-2017/5260 filed on Apr. 13, 2017, which is incorporated herein by reference.

FIELD OF THE DISCLOSURE

The present disclosure relates to a holder for releasably connecting a handle to a tool, in which the holder comprises a space in which a handle end of a handle is rotatably introducible along essentially an axis of rotation to connect the handle to the holder, in which this space comprises a wall surface which extends around this axis of rotation, and this wall surface comprises one or more projecting cutting elements for cutting complementary screw thread by means of which the one or more cutting elements are releasably connectable and this during the rotary introduction of a handle end into the space, so that both an essentially smooth handle end and a handle end comprising external screw thread are releasably connectable to this holder.

The present disclosure also relates to tools comprising this holder, in which the tool comprises a working element and a coupling piece which carries the working element, in which the coupling piece is made of a material comprising substantially plastic. The present disclosure also relates to a method for manufacturing this holder and methods for manufacturing these tools.

BACKGROUND

The term handle in this case refers to a handle bar which has, at least partly, the shape of a stick or a shaft, such as for example a brush handle, a handle for a floor mop, a handle for a shovel, a handle for a doctor blade, etc.

Tools, such as floor mops, brushes, shovels, doctor blades, forks, etc., comprise a working element, by means of which the function of the tool can be performed. Working elements may, for example, comprise a rubber wiper strip, brush hairs, etc. These tools are provided with a coupling piece which forms part of the working element or is connected to the working element for connecting a handle to the working element, so that it is possible to handle the tool in a simple manner. To this end, this coupling piece is connected to a holder or this coupling piece comprises a holder in which a handle end is finable.

These tools are provided with different types of holders, depending on the type of tool and/or the design thereof.

Tools comprising a coupling piece made of polypropylene usually comprise a holder made of polypropylene, in which case this holder is connected to this coupling piece by means of rotary welding. This holder comprises a space which extends around an axis of rotation and the wall surface of this space comprises an internal screw thread. These holders are then configured to be connected to handles comprising a handle end with external screw thread which corresponds with said internal screw thread of the holder. This external screw thread is then, for example, made of polypropylene, whereas the remainder of the handle is made of another material, such as metal. Often, it is desirable to be able to connect these holders using wooden handles with a conical smooth handle end. With brushes and floor mops, it is useful, for example, for a user to be able to choose which type of handle to connect to the brush or floor mop. Said holders can therefore additionally be provided with a clamping system by means of which the handle can be clamped. With soft wood types, an external screw thread will be cut/formed in the handle end of the wooden handle when turning the handle into the space. The clamping action by the clamping system is then an additional clamping action which hampers movement in the direction of the axis of rotation. In this case, the drawback is the fact that the internal screw thread will become blunt after frequent use of the wooden handles, so that the threaded connection becomes less secure. In addition, the clamping system still allows rotation about the axis of rotation. In other words, these tools may in theory be connected by wooden handles, but in practice, this is not done often or at least not frequently.

There are also tools comprising coupling pieces made of wood into which a metal holder has been knocked. This metal holder is then provided with internal screw thread which is able to cut a screw thread in smooth wooden surfaces. When a metal holder of a certain hardness is used, the cutting of screw thread into wooden handles will not cause wear of the internal screw thread. As a result thereof, this tool is connectable to metal/plastic handles with a corresponding external screw thread and also to wooden handles with a smooth handle end. However, providing tools, using coupling pieces made of plastic, with this metal holder is not easy.

SUMMARY

It is therefore an object of some embodiments of the invention to manufacture a holder which is readily connectable to different types of handles and in which this holder is coupleable to tools comprising coupling pieces made of plastic and/or can simply form part of tools comprising coupling pieces made of plastic. It is also an object of some embodiments of the invention to manufacture a tool comprising a coupling piece made of plastic, in which this tool is readily connectable to different types of handles.

This object may be achieved, on the one hand, by providing a holder for releasably connecting a handle to the tool, in which the holder comprises a space in which a handle end of a handle is rotatably introducible along essentially an axis of rotation to connect the handle to the holder, in which this space comprises a wall surface which extends around this axis of rotation and this wall surface comprises one or more projecting cutting elements for cutting complementary screw thread by means of which the one or more cutting elements are releasably connectable and this during the rotary introduction of a handle end into the space, so that both an essentially smooth handle end and a handle end comprising external screw thread are releasably connectable to this holder, in which the holder comprises a coupling portion comprising the one or more cutting elements and a retaining portion for retaining the coupling portion, in which the coupling portion is made of a first material and the retaining portion is made of a second material, with the hardness of the first material being greater/higher than the hardness of the second material and with the second material substantially comprising plastic.

In this case, the one or more projecting cutting elements may, for example, be internal screw thread or may be one or more segments of internal screw thread. External screw thread which corresponds with these one or more projecting cutting elements is thus releasably coupleable to these one or more cutting elements. In other words, handles comprising such external screw thread are easily connectable to this holder.

In this case, the one or more projecting cutting elements are able to cut external screw thread in handle ends which are fitted into the space in a rotary fashion. In this case, the expression cutting external screw thread is understood to mean the fact that external screw thread is formed on the handle end. These one or more cutting elements could thus also be referred to by the term one or more screw thread-forming elements.

In this case, the coupling portion comprising the one or more cutting elements is made of a material having a greater hardness than the first material. The harder the material from which the one or more cutting elements are made, the better they are able to cut screw thread into a handle end. This also means that the one or more cutting elements will wear down less quickly or not at all during use and/or when being connected to the handles. In other words, this holder is readily able to cut external screw thread into smooth handle ends which are made of a material with a lower hardness than the hardness of the first material, such as for example conical smooth handle ends made of certain wood types. Also, these one or more cutting elements may engage in corresponding external screw thread. If it is desired to connect the one or more cutting elements to non-corresponding external screw thread, these one or more cutting elements will also readily be able to cut new external screw thread if this non-corresponding external screw thread is made of a material with a lower hardness than the hardness of the first material.

It is thus possible to connect different types of handles with a tool by means of this holder.

Since the retaining portion is made of plastic, this retaining portion can easily be connected to components which are made of plastic. Preferably, the plastic of which said component is made essentially has the same melting point as the plastic of which the retaining portion is made. A known technique to achieve this is friction welding, more specifically rotary welding. In other words, this universal holder can easily be connected to tools comprising a working element and a coupling piece which carries the working element, with this coupling piece being made of plastic. In this case, the retaining portion in itself may also form the coupling piece of a tool. It is thus possible to choose the plastic to be used for the retaining portion on the basis of the tool and still provide the desired hardness for the coupling portion, so that the holder is usable for many types of handles. The expression essentially the same melting point is in this case preferably understood to mean that the melting point of the coupling piece does not differ from the melting point of the second material by more than 10° C., still more preferably by not more than 5° C.

The expression the retaining portion retains the coupling portion is understood to mean that the retaining portion retains the coupling portion in a certain position. To this end, the retaining portion and the coupling portion are connected to each other in such a way that, during use of the holder, the coupling portion essentially cannot move with respect to the retaining portion. Preferably, the coupling portion is essentially non-releasably connected to the retaining portion. Furthermore preferably, the retaining portion is arranged against the coupling portion and connected thereto by means of injection-moulding.

Preferably, the second material comprises polypropylene, still more preferably the second material substantially comprises polypropylene. Polypropylene is a raw material which is frequently used for brushes and floor mops. Most brushes and floor mops comprise a working element, comprising brush hairs and a wiper strip/wiping element, respectively, with these brushes and floor mops furthermore comprising a coupling piece which carries this working element. This coupling piece is often made of polypropylene, as this is an inexpensive raw material which can easily be formed into the desired shape and because such coupling pieces have a certain durability. However, the hardness of the polypropylene used is lower than the hardness of certain wood types which are used to manufacture the handles. In other words, if it is desired for the one or more cutting elements to cut satisfactorily for relatively long periods of time, these cutting elements cannot be made of such a polypropylene. The hardness of this employed polypropylene is between 65 and 80 Shore D. The hardness of the wood types which are currently used in the manufacture of handles is between 60 and 90 Shore D. In this case, said first material then has a hardness greater than the hardness of the polypropylene which is currently used in said tools. In other words, the hardness of the first material is then preferably greater than 80 Shore D, as a result of which said one or more cutting elements are able to cut external screw thread in a large number of wood types.

In a highly preferred embodiment, the coupling portion comprises an inner surface comprising the one or more projecting cutting elements, in which this inner surface at least partly forms said wall surface of the space, in which the coupling portion comprises an outer surface which is situated opposite the inner surface, in which this outer surface comprises one or more outwardly pointing protrusions, and in which the retaining portion bears against the outer surface of the coupling portion in such a way that the retaining portion at least partly encloses the one or more protrusions. This indicates that these protrusions are at least partly embedded in the retaining portion. The retaining portion is thus connected to the coupling portion in a very reliable manner, so that this connection cannot be disconnected, or at least only with great difficulty, when using the holder. When, for example, fitting the handle into the space and/or when using the tool into which the handle is fitted, forces are applied to the coupling portion. It is important that the retaining portion retains the coupling portion securely, so that these said portions do not come away from each other during use of the tool. Due to the fact that one or more of said protrusions are at least partly embedded in the retaining portion, the coupling portion will not, or hardly, move with respect to the retaining portion when forces are applied to the coupling portion. The retaining portion may be arranged against the coupling portion, for example by means of injection-moulding. In this case, the one or more protrusions provide additional mechanical anchoring for the coupling portion in the retaining portion.

The size of the retaining portion, viewed along a plane perpendicular to the axis of rotation, along a straight line which intersects the axis of rotation and in the vicinity of a said protrusion of the outer surface of the coupling portion, preferably essentially corresponds to the corresponding size of said protrusion. The tip of said protrusion is then embedded only just in the retaining portion. If there are several protrusions, then this is preferably the case with all of them. The retaining portion then extends between the protrusions, as it were. The retaining portion does then not, or only slightly, extend beyond the protrusions viewed along a radius through the axis of rotation. Such holders are easy to produce by first forming the coupling portion and then placing this coupling portion in a mould and to introduce plastic in the mould in order to form the retaining portion.

Furthermore preferably, one or more protrusions extend substantially along a plane which makes an angle with the axis of rotation. Preferably, this angle is between 5° and 85°, so that these protrusions are at an angle with respect to the axis of rotation. Forces acting on the coupling portion, such as for example forces which are directed along the axis of rotation or forces resulting from rotation around the axis of rotation, can thus be absorbed by these protrusions in a satisfactory way. The one or more protrusions are, for example, plate-shaped or bar-shaped elements, so that there is a certain contact area between these protrusions and the retaining portion, and the forces are thus transmitted from the protrusions to the retaining portion in a satisfactory manner. Furthermore preferably, said angle is between 30° and 60° and still more preferably essentially 45°.

It is also possible for one or more protrusions to be, for example, needle-shaped or cone-shaped protrusions, in which case the length directions of these protrusions make an angle with the axis of rotation.

Viewed along the axis of rotation, one or more protrusions have a T shape, with a part of each of these one or more protrusions extending substantially along the axis of rotation. Due to this shape, another part of the protrusion then extends substantially perpendicular to the axis of rotation. Forces which are directed along the axis of rotation and forces which are directed perpendicular to the axis of rotation can be absorbed in a highly satisfactory manner by such protrusions. The connection between the retaining portion and the coupling portion will thus not come loose during use of the holder or only with difficulty.

In a preferred embodiment, the coupling portion comprises an inner surface comprising the one or more projecting cutting elements, in which this inner surface substantially forms the wall surface of said space and the retaining portion largely extends around the coupling portion, viewed along the axis of rotation. Preferably, the retaining portion extends substantially around the coupling portion, so that the coupling portion is retained reliably by the retaining portion and the retaining portion does not block access to the space. Here, the wall surface is essentially entirely made of the harder first material, as a result of which the wall surface is less susceptible to wear. Preferably, the inner surface is the wall surface.

Furthermore preferably, the coupling portion substantially forms the space, the inner surface substantially forms the wall surface and the coupling portion, viewed along the axis of rotation, comprises an opening on one side, via which the space is accessible, and a bottom on the other side, so that the space is substantially delimited by the bottom and the inner surface, in which this bottom comprises one or more outwardly pointing limbs, in which the retaining portion bears against this bottom and at least partly encloses the one or more limbs. In this case, the limbs of the bottom are then at least partly embedded in the retaining portion, as a result of which the connection between the retaining portion and the coupling portion is a very strong connection.

In a highly preferred embodiment, the space is substantially conical, the holder comprises an opening via which the space is accessible, with the diameter of the space, viewed along the axis of rotation, increasing in the direction of the opening. Due to this conical shape, this holder is readily capable of cutting screw thread in conical smooth handle ends and also in conical handle ends comprising external screw thread which is not complementary with the one or more cutting elements.

Preferably, the wall surface of the space comprises one said cutting element and this cutting element is an internal screw thread. If the coupling portion is made substantially of a relatively hard plastic, such as for example polycarbonate, it is easy to form a coupling portion comprising internal screw thread by means of injection-moulding. It is also very easy to form/cut an external screw thread by means of an internal screw thread.

In another embodiment, said one or more cutting elements are several teeth which together form at least one segment of internal screw thread. If the coupling portion is made of metal, it is simpler to form one or more segments of an internal screw thread by means of projecting teeth.

Preferably, the first material has a hardness of at least 80 Shore D. Still more preferably, the first material has a hardness of at least 85 Shore D, even more preferably of at least 90 Shore D. Handles are made of wood or comprise handle ends with an external screw thread which is made of plastic, such as polypropylene. The wood types which are frequently used for handles usually have a hardness of between 60 Shore D and 90 Shore D. The polypropylene of the external screw thread with handles usually has a hardness of between 65 Shore D and 80 Shore D. In order to be able to readily cut/form external screw thread in many of the handles used, the first material thus preferably has a hardness which is greater than 80 Shore D.

Furthermore preferably, the first material is substantially made of polycarbonate or of a metal. Polycarbonate has an average hardness of between 80 and 100 Shore D. Preferably, the first material is then substantially made of a polycarbonate with a hardness of between 90 and 100 Shore D.

This object may also be achieved by providing a tool comprising a holder as described above, in which the tool comprises a working element and a coupling piece which carries the working element, in which the coupling piece is made of a material comprising substantially plastic, in which the melting point of the material of the coupling piece essentially corresponds to the melting point of the second material and in which the coupling piece is connected to the retaining portion of holder. Preferably, the material of the coupling piece essentially corresponds to the second material.

The working element comprises, for example, brush hairs or a wiper strip. It may optionally in addition comprise a holding element for brush hairs or a holding element for the wiper strip.

In this case, a holder and a coupling piece are thus produced which can easily and essentially non-releasably be connected to each other by using simple techniques. It is easy to connect plastic components having essentially the same melting point by locally fusing these plastic components together. This may be achieved, for example, by means of friction welding. This is a simple way of providing a tool comprising a plastic coupling piece with one or more of said cutting elements of sufficient hardness, so that this tool is readily coupleable with different handles.

This object may also be achieved by providing a tool comprising a holder as described above, in which the tool comprises a working element and a coupling piece which carries the working element, in which the coupling piece is made of a material comprising substantially plastic, in which the coupling piece is the retaining portion of the holder. In this case, the coupling piece then has two functions, that is retaining the working element and retaining the coupling portion. In this case, the material from which the coupling piece is made is thus said second material. In this case, the holder then also has two functions, that is coupleably connecting the tool with a handle and retaining the working element.

This object may also be achieved by providing a method for manufacturing a holder, in which the holder is a holder as described above and the method comprises the following steps:

manufacturing the coupling portion;

placing the coupling portion in a mould and injection-moulding plastic in this mould in order to form the retaining portion against the coupling portion.

By manufacturing the holder in this way, the coupling portion will be formed separately, as a result of which this can then easily be made of the desired material, i.e. the first material. By then placing this coupling portion in the mould and introducing plastic into this mould, this plastic will adhere to the coupling portion, as a result of which the plastic retaining portion formed will securely retain the coupling portion. By means of a mould, the retaining portion can be given the desired shape, being, for example, a shape which can easily be connected to said coupling piece of a tool or being the shape of the coupling piece.

In a preferred embodiment, the coupling portion comprises positioning elements, in which, after the coupling portion has been placed in the mould, these positioning elements retain the coupling portion in an essentially fixed position during the introduction of the plastic into the mould. In the case of injection-moulding, the plastic is introduced into the mould at a certain pressure. In this case, the one or more positioning means prevent the coupling portion in the mould from changing position during injection-moulding, as a result of which the desired holder is always formed.

Furthermore preferably, the coupling portion comprises an inner surface comprising the one or more projecting cutting elements, in which this inner surface at least partly forms said wall surface of the space and the coupling portion comprises an outer surface situated opposite the inner surface, in which this outer surface comprises one or more outwardly directed protrusions, in which at least one of these one or more protrusions essentially bears against an edge of the mould and these one or more protrusions are one or more of said positioning elements. By using one or more protrusions which bear against one or more edges of the mould, the coupling portion is securely held in place in the mould during the introduction of the plastic into the mould by injection-moulding. For in the case of injection-moulding, the plastic is introduced into the mould at a certain pressure. In this case, the one or more protrusions prevent the coupling portion in the mould from changing position during injection-moulding, as a result of which the desired holder is always formed. In addition, the plastic will also adhere here to these one or more protrusions, as a result of which these one or more protrusions are at least partly embedded in the plastic. The coupling portion is then additionally mechanically anchored in the retaining portion by means of these one or more protrusions. Consequently, the coupling portion will not come away from the retaining portion or only with great difficulty. This is particularly important during use of the holder since it is during use that forces will be applied to the coupling portion, and the aim is for the coupling portion not to change position with respect to the retaining portion while the holder is being used.

Furthermore preferably, the coupling portion substantially forms the space, the inner surface substantially forms the wall surface and the coupling portion, viewed along the axis of rotation, comprises an opening on one side, via which the space is accessible, and a bottom on the other side, so that the space is substantially delimited by the bottom and the inner surface, in which this bottom comprises one or more outwardly directed limbs, in which at least one of these one or more limbs essentially bear against an edge of the mould and these one or more limbs are one or more of said positioning elements. In this case, the retaining portion will then surround a large part of the coupling portion, as a result of which the coupling portion is retained very securely by the retaining portion. In addition, a large part of the outer surface of the holder is thus formed by the retaining portion, as a result of which a larger contact area is possible between the retaining portion and said coupling piece of a tool by means of which the holder is to be connected.

The holder is connected to the coupling piece by means of friction welding, preferably at the location of its retaining portion. In this way, the coupling piece may, for example, be connected to the coupling piece by rotary welding. In this way, a tool as described above is then formed.

BRIEF DESCRIPTION OF THE DRAWINGS

In the following description, holders, tools and a method according to the present invention are described in detail. The sole aim of this detailed description is to indicate how the invention may be brought about and to illustrate the particular characterizing features of the invention and, where necessary, explain these further. This description can thus by no means be seen as a limitation of the scope of protection of the patent. Neither can the area of application of the invention be limited on the basis of the following description.

In this description, reference is made to the attached figures, in which.

DETAILED DESCRIPTION

These figures illustrate two types of holders (1) which are each configured to be connected with a coupling piece (13) of a tool (2). Obviously, other types of holders are possible. Holders which themselves form the coupling piece of a tool are also possible, but are not shown here.

Figure 1:
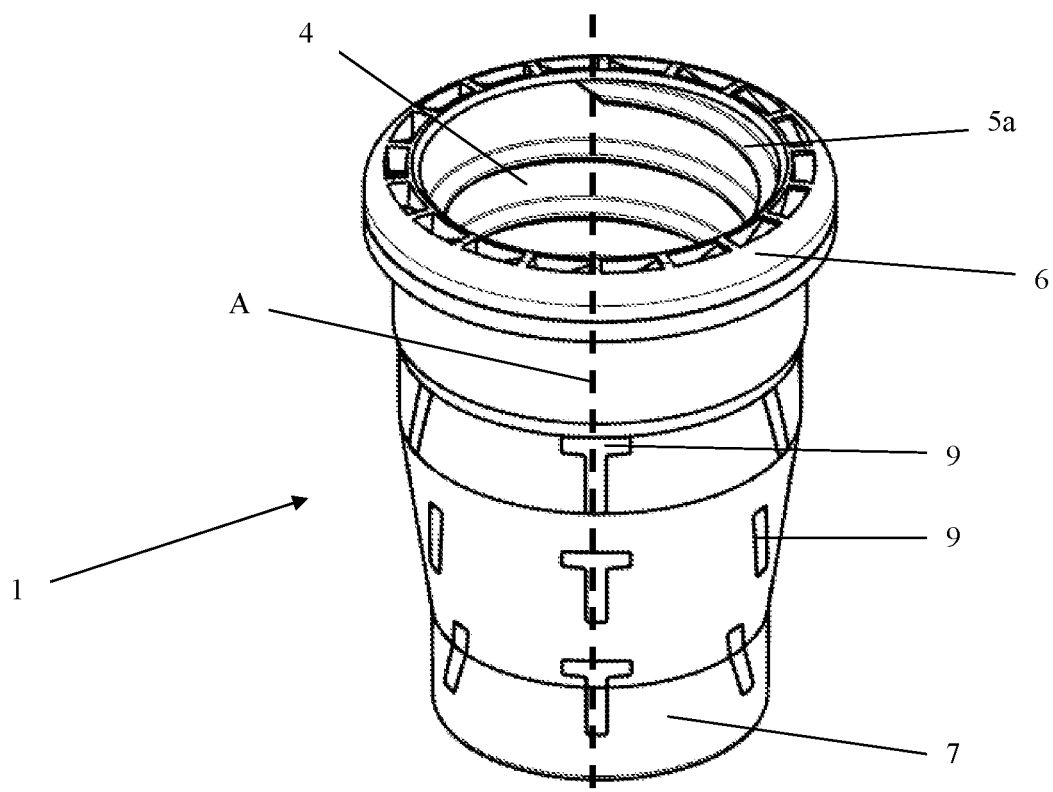
FIG. 1 shows a perspective view of a first embodiment of a holder according to the invention.
Figure 2:
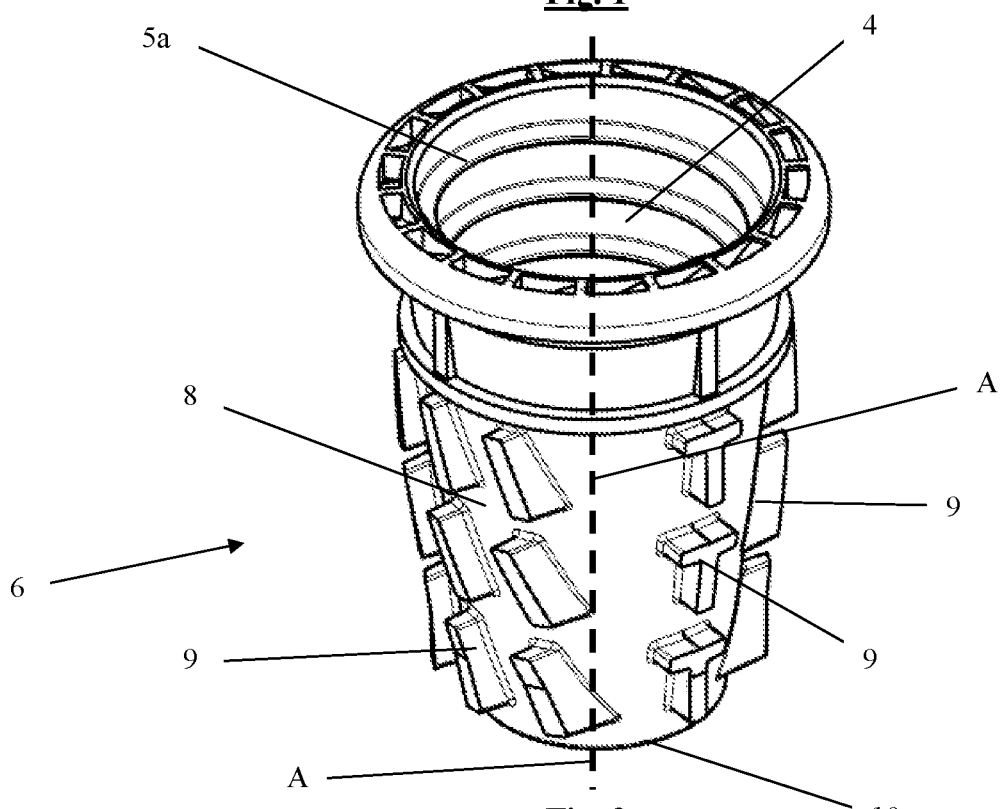
FIG. 2 shows a perspective view of the coupling portion of the holder illustrated in FIG. 1.
Figure 3:
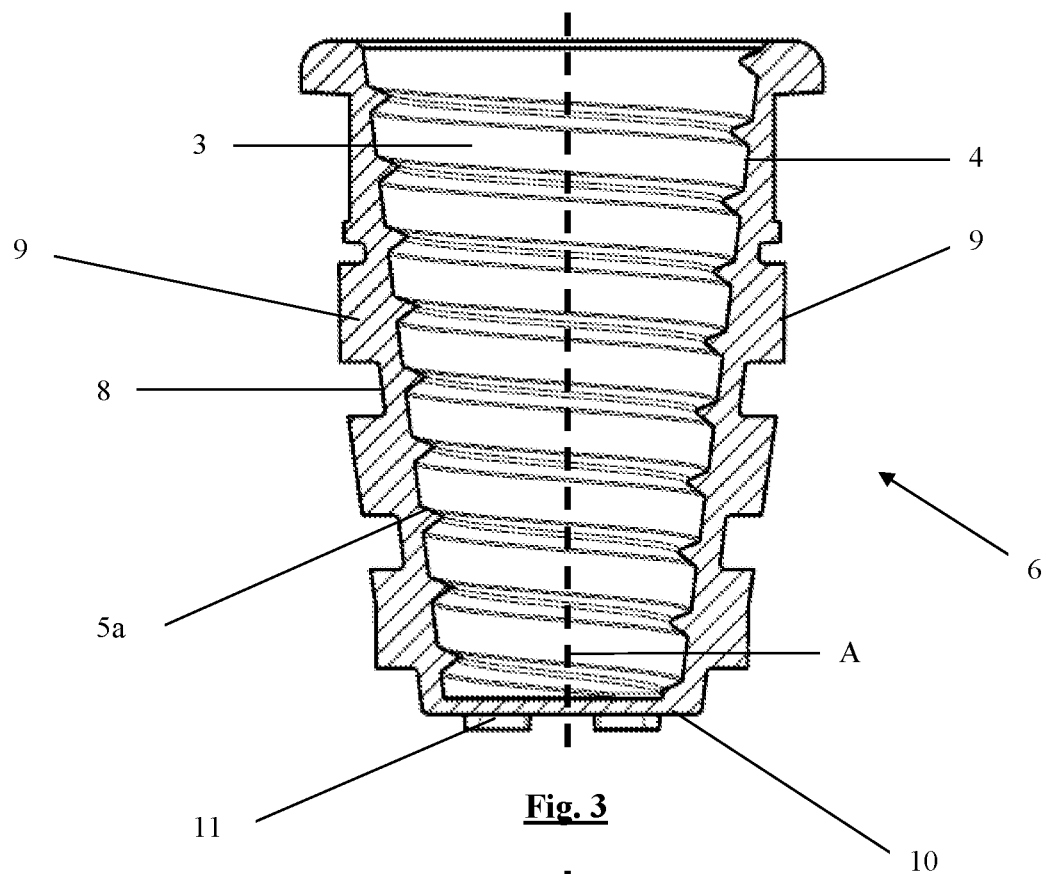
FIG. 3 shows a cross section of the coupling portion illustrated in FIG. 2.
Figure 4:
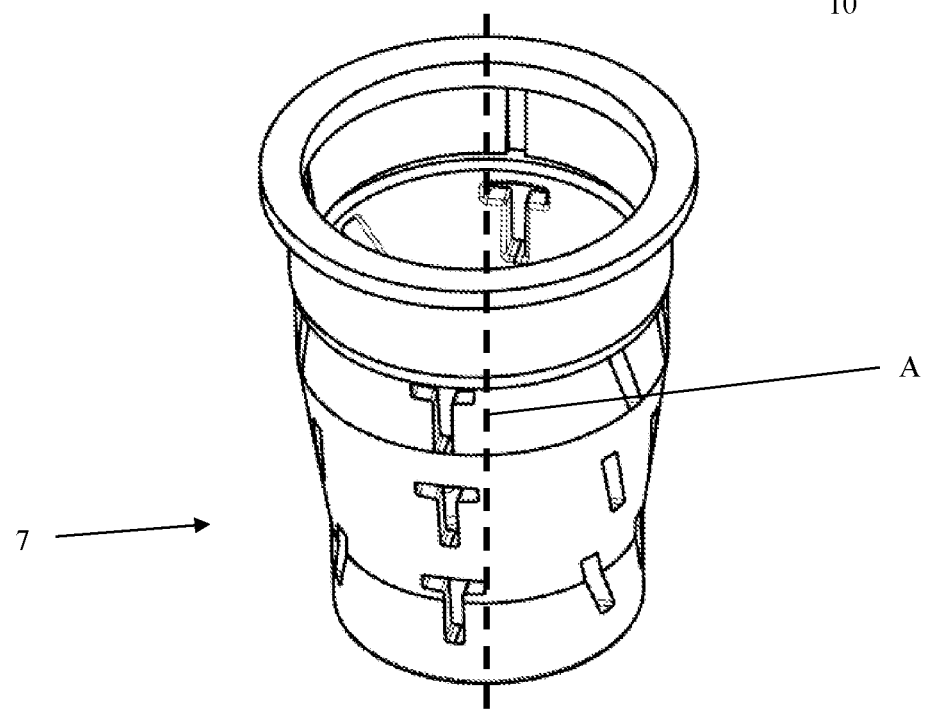
FIG. 4 shows a perspective view of the holder illustrated in FIG. 1, in which the coupling portion is not shown, so that only the retaining portion is visible.
Figure 5:
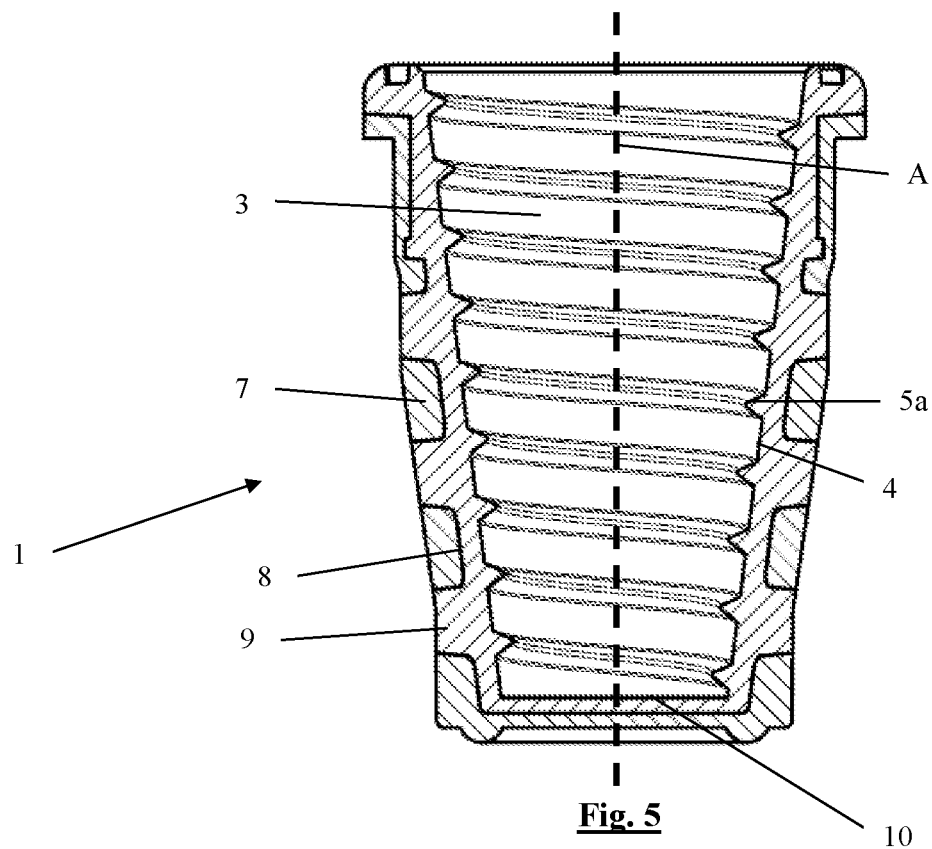
FIG. 5 shows a cross section of the holder illustrated in FIG. 1.
Figure 6:
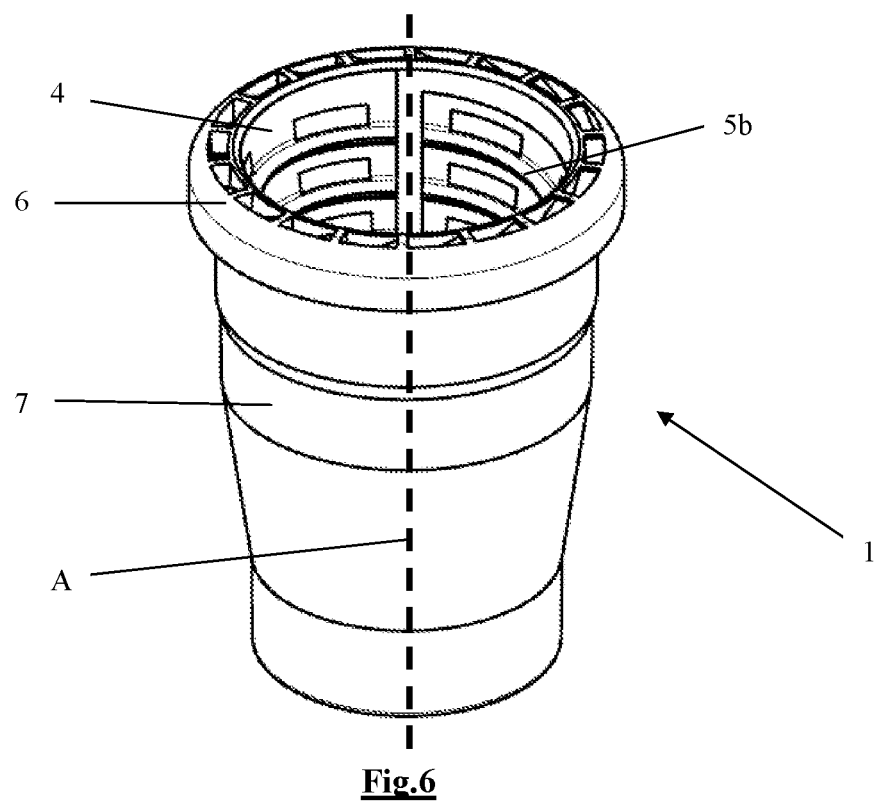
FIG. 6 shows a perspective view of a second embodiment of a holder according to the invention.
Figure 7:
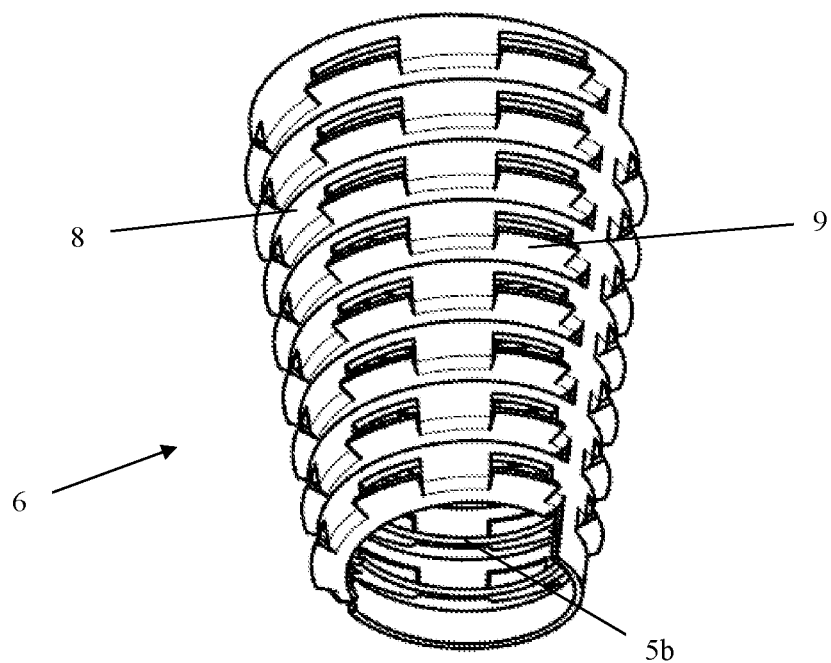
FIG. 7 shows a perspective view of the coupling portion of the holder illustrated in FIG. 6.
Figure 8:
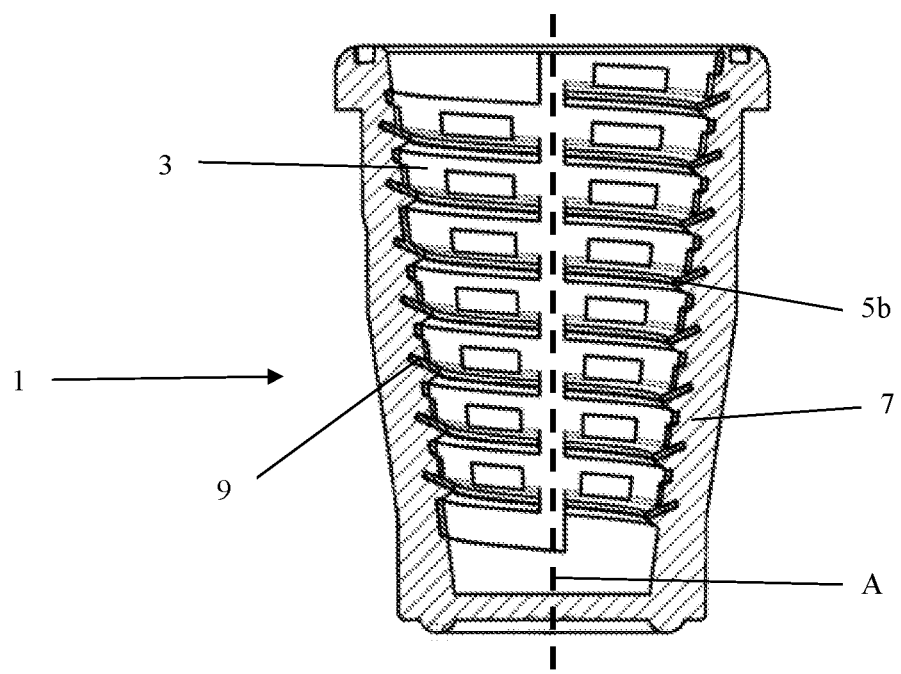
FIG. 8 shows a cross section of the holder illustrated in FIG. 6.

FIGS. 1 to 5 show a first embodiment of a holder (1) according to the invention. FIGS. 6 to 8 show a second embodiment of a holder (1) according to the invention.

The holders (1) according to both embodiments are composed of two portions (6, 7), being a coupling portion (6) and a retaining portion (7), in which the coupling portion (6) and the retaining portion (7) are essentially non-releasably connected to each other. This retaining portion (7) is substantially made of polypropylene. The coupling piece (13) which is configured to be connected with the holder (1) is substantially made of the same polypropylene.

Each holder (1) comprises a space (3), in which a handle end of a handle is rotatably introducible along essentially an axis of rotation (A), in order to connect the handle to the holder (1). This space (3) comprises a wall surface which extends around this axis of rotation (A) and this wall surface comprises one or more projecting cutting elements (5a, 5b) for cutting complementary external screw thread by means of which the one or more cutting elements (5a, 5b) are releasably connectable during the rotary introduction of a handle end into the space (3), so that an essentially smooth handle end or a handle end comprising (complementary) external screw thread is releasably connectable to this holder (1).

The coupling portion (6) comprises the one or more cutting elements (5a, 5b) and the retaining portion (7) retains the coupling portion (6). The coupling portion (6) is made of a first material. The hardness of the first material is greater than the hardness of said polypropylene.

The polypropylene has a hardness of between 65 and 85 Shore D. The first material has a hardness which is greater than 90 Shore D. In the first embodiment, the first material substantially comprises polycarbonate. In the second embodiment, the second material substantially comprises metal. In this case, the one or more cutting elements (5a, 5b) thus have a hardness which is greater than 90 Shore D. As the wood types which are currently being used for handles have a hardness which is between 60 and 90 Shore D, this means that the one or more cutting elements (5a, 5b) are harder than current wooden handles and are thus able to form/cut external screw thread on a handle end of these wooden handles.

Furthermore, each coupling portion (6) comprises an inner surface (4) comprising the one or more projecting cutting elements (5a, 5b), in which this inner surface (4) substantially forms said wall surface of the space (3). The coupling portion (6) comprises an outer surface (8) which is situated opposite the inner surface (4), in which this outer surface (8) comprises one or more outwardly directed protrusions (9), in which the retaining portion (7) bears against the outer surface (8) of the coupling portion (6) and at least partly encloses the one or more protrusions (9). In this case, the protrusions (9) are thus at least partly embedded in the retaining portion (7).

With the first embodiment, the size of the retaining portion (7), viewed along a plane perpendicular to the axis of rotation (A), along a straight line which intersects the axis of rotation (A) and at the location of each said protrusion (9) of the outer surface (8) of the coupling portion (6), essentially corresponds to the corresponding size of said protrusion (9). With the first embodiment, the protrusions (9) of the coupling portion (6) and the retaining portion (7) together then form a smooth outer surface of the holder (1). In this case, the tip of each protrusion (9) is not enclosed by the retaining portion (7). This design is mainly determined by the production method of this holder (1) (see below).

With the second embodiment, the protrusions (9) are completely embedded in the retaining portion (7).

Two types of protrusions (9) are present in the coupling portion (6) of the first embodiment of the holder (1), namely fin-shaped protrusions (9) which extend along a plane and T-shaped protrusions (9). Said faces make an angle with the axis of rotation (A) of essentially 45°. Due to this position, these fin-shaped protrusions (9) are readily able to absorb forces directed along the axis of rotation (A), rotation forces around the axis of rotation (A) and forces which make an angle with the axis of rotation (A). The T-shaped protrusions (9), viewed along the axis of rotation (A), have a T shape, with a first part of the protrusion (9) substantially extending along the axis of rotation (A) and a second part extending perpendicular to the axis of rotation (A), as a result of which the first part is readily able to absorb rotation forces around the axis of rotation (A) and the other part is readily able to absorb forces which are directed along the axis of rotation (A).

The coupling portion (6) of the second embodiment comprises one type of protrusions (9), each of which makes an angle with the axis of rotation (A).

With the first embodiment, the coupling portion (6) substantially forms the space (3), the inner surface (4) substantially forms the wall surface and the coupling portion (6), viewed along the axis of rotation (A), comprises an opening on one side, via which the space (3) is accessible, and a bottom (10) on the other side, so that the space (3) is delimited by the bottom (10) and the inner surface (4). This bottom (10) furthermore comprises one or more outwardly directed limbs (11), in which the retaining portion (7) bears against this bottom (10) and at least partly encloses the one or more limbs (11).

In both embodiments, the space (3) is conical, with the holder (1) comprising an opening via which the space (3) is accessible and with the diameter of the space (3), viewed along the axis of rotation (A), increasing in the direction of the opening.

In the first embodiment, one said cutting element (5a) is present and this cutting element (5a) is an internal screw thread (5a). In the second embodiment, several cutting elements (5b) are present which together form two segments of the same internal screw thread.

Forming the holders (1) illustrated above proceeds as follows: first, the coupling portion (6) is formed separately. In the first embodiment, this is achieved by means of injection-moulding. Subsequently, the retaining portion (7) is formed around the coupling portion (6) in such a way that the protrusions (9) and optionally the limbs (11) are (substantially) embedded in the retaining portion (7).

In the first embodiment comprising the coupling portion (6) made of polycarbonate, this coupling portion (6) is placed in a mould. The design of the mould and the design of the protrusions (9) and the limbs (11) are adapted to each other in such a way that the protrusions (9) and the limbs (11) come into contact with the walls of the mould. When polypropylene is introduced into the mould in order to form the retaining portion (7), the protrusions (9) and limbs (11) will ensure that the coupling portion (6) remains stable and does not move in the mould. Thus, these protrusions (9) and limbs (11) serve as positioning elements (9, 11) which keep the coupling portion (6) in an essentially fixed position during the introduction of the polypropylene into the mould. The faces of the protrusions (9) which come into contact with the mould are not covered with polypropylene and thus remain visible after the holder (1) has been formed.

Figure 9:
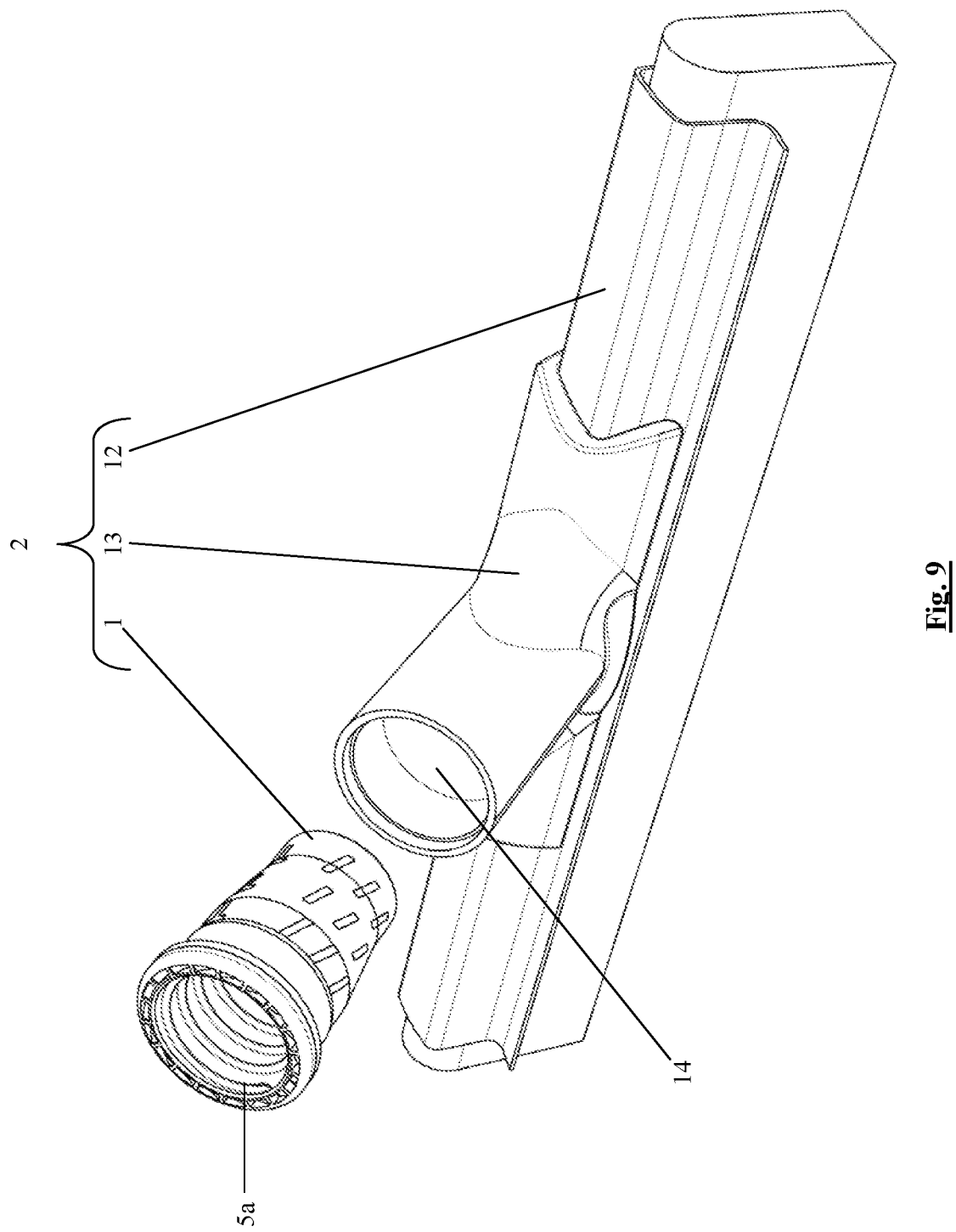
FIG. 9 shows a perspective view of a tool according to the invention, in which the holder is not yet connected to the coupling piece.

Forming a tool (2) comprising an aforementioned holder (1) proceeds as follows. A holder (1) and a coupling piece (13) connected to a working element (12) are formed independently from each other. In this case, the tool (2) is a floor mop, so that the working element (12) is a wiper element. It can be seen in FIG. 9 that the working element (12) comprises a holding element for holding the wiper element. The bearing element is connected to the coupling piece (13). Furthermore, the coupling piece (13) is substantially made of polypropylene. The coupling piece (13) is provided with a recess (14) which essentially has the shape of the outer wall of the holder (1). The holder (1) is then inserted into this recess (14) and connected to the coupling piece (13) by means of rotary welding. The resulting tool (2) is connectable with different types of handles.

The invention claimed is:

1. A holder for releasably connecting a handle to a tool, in which the holder comprises a space in which a handle end of a handle is rotatably introducible along essentially an axis of rotation to connect the handle to the holder, in which the space comprises a wall surface which extends around the axis of rotation, and the wall surface comprises one or more projecting cutting elements for cutting complementary screw thread by means of which the one or more cutting elements are releasably connectable during the rotary introduction of a handle end into the space, so that both an essentially smooth handle end and a handle end comprising external screw threads are releasably connectable to the holder,
   wherein the holder comprises a coupling portion comprising the one or more cutting elements and a retaining portion for retaining the coupling portion, in which the coupling portion is made of a first material and the retaining portion is made of a second material, with the hardness of the first material being greater than the hardness of the second material and with the second material substantially comprising plastic, and
   wherein the coupling portion comprises an inner surface comprising the one or more projecting cutting elements, in which the inner surface at least partly forms said wall surface of the space, and in that the coupling portion comprises an outer surface which is situated opposite the inner surface, in which the outer surface comprises one or more outwardly pointing protrusions, and in which the retaining portion bears against the outer surface of the coupling portion in such a way that the retaining portion at least partly encloses the one or more protrusions, and
   wherein the coupling portion comprises an inner surface comprising the one or more projecting cutting elements, in which this inner surface substantially forms the wall surface of said space and the retaining portion largely extends around the coupling portion, viewed along the axis of rotation, and the coupling portion substantially forms the space, the inner surface substantially forms the wall surface and the coupling portion, viewed along the axis of rotation, comprises an opening on one side, via which the space is accessible, and a bottom on the other side, so that the space is substantially delimited by the bottom and the inner surface, in which the bottom comprises one or more outwardly pointing limbs, in which the retaining portion bears against this bottom and at least partly encloses the one or more limbs.

2. The holder according to claim 1, characterized in that the second material comprises substantially polypropylene.

3. The holder according to claim 1, characterized in that the size of the retaining portion, viewed along a plane perpendicular to the axis of rotation, along a straight line which intersects the axis of rotation and in the vicinity of a said protrusion of the outer surface of the coupling portion, essentially corresponds to the corresponding size of said protrusion.

4. The holder according to claim 1, characterized in that one or more of the protrusions extend substantially along a plane which makes an angle with the axis of rotation.

5. The holder according to claim 1, characterized in that one or more of the protrusions, viewed along the axis of rotation, have a T shape, with a part of each of the one or more protrusions extending substantially along the axis of rotation.

6. The holder according to claim 1, characterized in that the coupling portion comprises an inner surface comprising the one or more projecting cutting elements, in which this inner surface substantially forms the wall surface of said space and the retaining portion largely extends around the coupling portion, viewed along the axis of rotation.

7. The holder according to claim 1, characterized in that the space is substantially conical, the holder comprising an opening via which the space is accessible, with the diameter of the space, viewed along the axis of rotation, increasing in the direction of the opening.

8. The holder according to claim 1, characterized in that the wall surface of the space comprises one said cutting element, and in that the cutting element is an internal screw thread.

9. The holder according to claim 1, characterized in that said one or more cutting elements are several teeth which together form at least a segment of an internal screw thread.

10. The holder according to claim 1, characterized in that the first material has a hardness of at least 80 Shore D.

11. The holder according to claim 10, characterized in that the first material substantially comprises polycarbonate or metal.

12. A tool comprising a holder according to claim 1, in which the tool comprises a working element and a coupling piece which carries the working element, in which the coupling piece is made of a material comprising substantially plastic, in which the melting point of the material of the coupling piece essentially corresponds to the melting point of the second material, in which the coupling piece is connected to the retaining portion of the holder, and in which the holder is friction welded to the coupling piece at the location of its retaining portion.

13. The tool according to claim 12, characterized in that the material of the coupling piece essentially corresponds to the second material.

14. A tool comprising a holder according to claim 1, wherein the tool comprises a working element and a coupling piece which carries the working element, in which the coupling piece is made of a material comprising substantially plastic, in which the coupling piece is the retaining portion of the holder.

15. A method for manufacturing a tool comprising a holder, wherein:
   the holder releasably connects a handle to the tool, the holder comprising:
   a space in which a handle end of the handle is rotatably introducible along essentially an axis of rotation to connect the handle to the holder, the space comprising a wall surface which extends around the axis of rotation, the wall surface comprising one or more projecting cutting elements for cutting complementary screw thread by means of which the one or more cutting elements are releasably connectable during the rotary introduction of a handle end into the space, so that both an essentially smooth handle end and a handle end comprising external screw threads are releasably connectable to the holder,
   a coupling portion comprising the one or more cutting elements and a retaining portion for retaining the coupling portion, wherein the coupling portion is made of a first material and the retaining portion is made of a second material, with the hardness of the first material being greater than the hardness of the second material and with the second material substantially comprising plastic, the coupling portion comprising an inner surface comprising the one or more projecting cutting elements, wherein the inner surface at least partly forms said wall surface of the space, the coupling portion comprising an outer surface which is situated opposite the inner surface, the outer surface comprising one or more outwardly pointing protrusions, wherein the retaining portion bears against the outer surface of the coupling portion in such a way that the retaining portion at least partly encloses the one or more protrusions, the tool comprises:

a working element and a coupling piece which carries the working element, wherein the coupling piece is made of a material comprising substantially plastic, wherein the melting point of the material of the coupling piece essentially corresponds to the melting point of the second material, wherein the coupling piece is connected to the retaining portion of the holder, and wherein the holder is connected to the coupling piece at the location of its retaining portion by means of friction welding.

* * * * *